United States Patent
Skelley et al.

[11] Patent Number: 6,162,409
[45] Date of Patent: Dec. 19, 2000

[54] PROCESS FOR REMOVING $NO_x$ AND $SO_x$ FROM EXHAUST GAS

[75] Inventors: Arthur P. Skelley, 105 Lintel Dr., McMurray, Pa. 15317; John M. Koltick, Jr., Bethel Park, Pa.; Naresh J. Suchak, North Plainfield, N.J.; Wesley M. Rohrer, Jr., Pittsburgh, Pa.

[73] Assignee: Arthur P. Skelley, McMurray, Pa.

[21] Appl. No.: 09/268,385

[22] Filed: Mar. 15, 1999

[51] Int. Cl.⁷ .............................. B01J 8/00; C01B 21/00; C01B 17/00; C01B 21/38

[52] U.S. Cl. .................. 423/239.1; 423/235; 423/242.1; 423/393

[58] Field of Search ................................ 423/235, 242.1, 423/393, 239.1

[56] References Cited

U.S. PATENT DOCUMENTS 4,011,298  3/1977  Fukui et al. ........................... 423/235

FOREIGN PATENT DOCUMENTS 51-003367  1/1976  Japan .

OTHER PUBLICATIONS

"Simultaneous Oxidation of Nitrogen Oxides and Sulfur Dioxide with Ozone and Hydrogen Peroxide" Nelo et al., Chem. Eng. Technol. vol. 20, p.(40–42), 1997.

Primary Examiner—Steven P. Griffin
Assistant Examiner—Maribel Medina
Attorney, Agent, or Firm—Price & Adams

[57] ABSTRACT

An exhaust gas stream containing oxides of nitrogen and sulfur from a fossil fuel fired boiler, a fired process heater, or a chemical process are diverted from a stack prior to emission to the atmosphere through a duct system to a mixer where an oxidant, such as ozone, is added to the exhaust gas at a preselected molar ratio for a preselected residence time to transform the oxides to higher order nitrogen oxides. The oxidized contaminants are treated with a reagent solution. The reagent solution absorbs the oxidized contaminants and unreacted oxidant in the exhaust gas stream. Nitrogen and sulfur oxides in the gas steam are transformed to dilute acids which are neutralized to form salts suitable for discharge to a municipal waste water treatment plant or landfill disposal. The salt solution is also useful as a fertilizer or in the manufacture of fertilizers. The treated exhaust gas is then emitted from an exhaust stack containing $NO_x$ and $SO_x$ contaminants at a ppm level meeting required air quality standards.

24 Claims, 3 Drawing Sheets

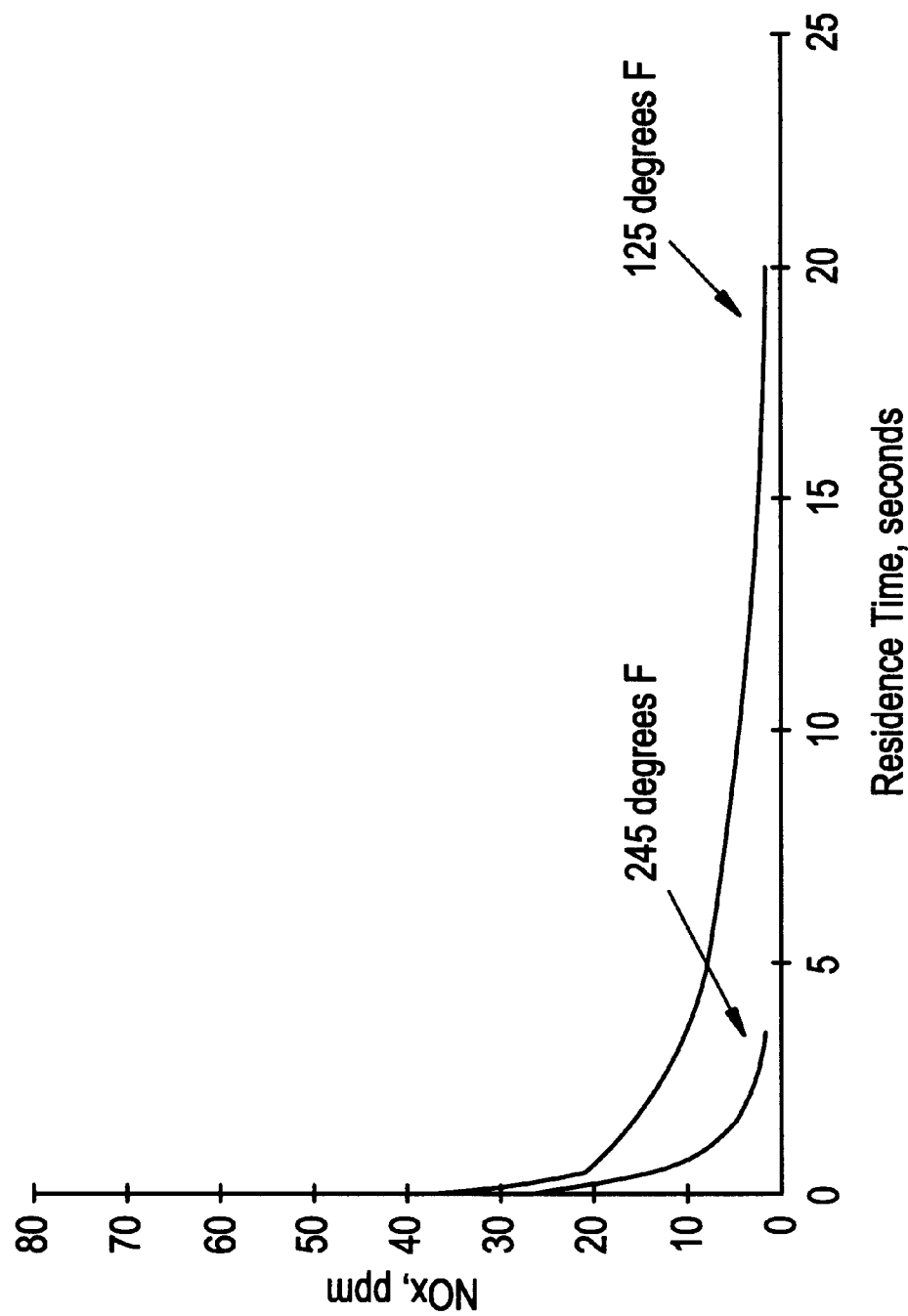

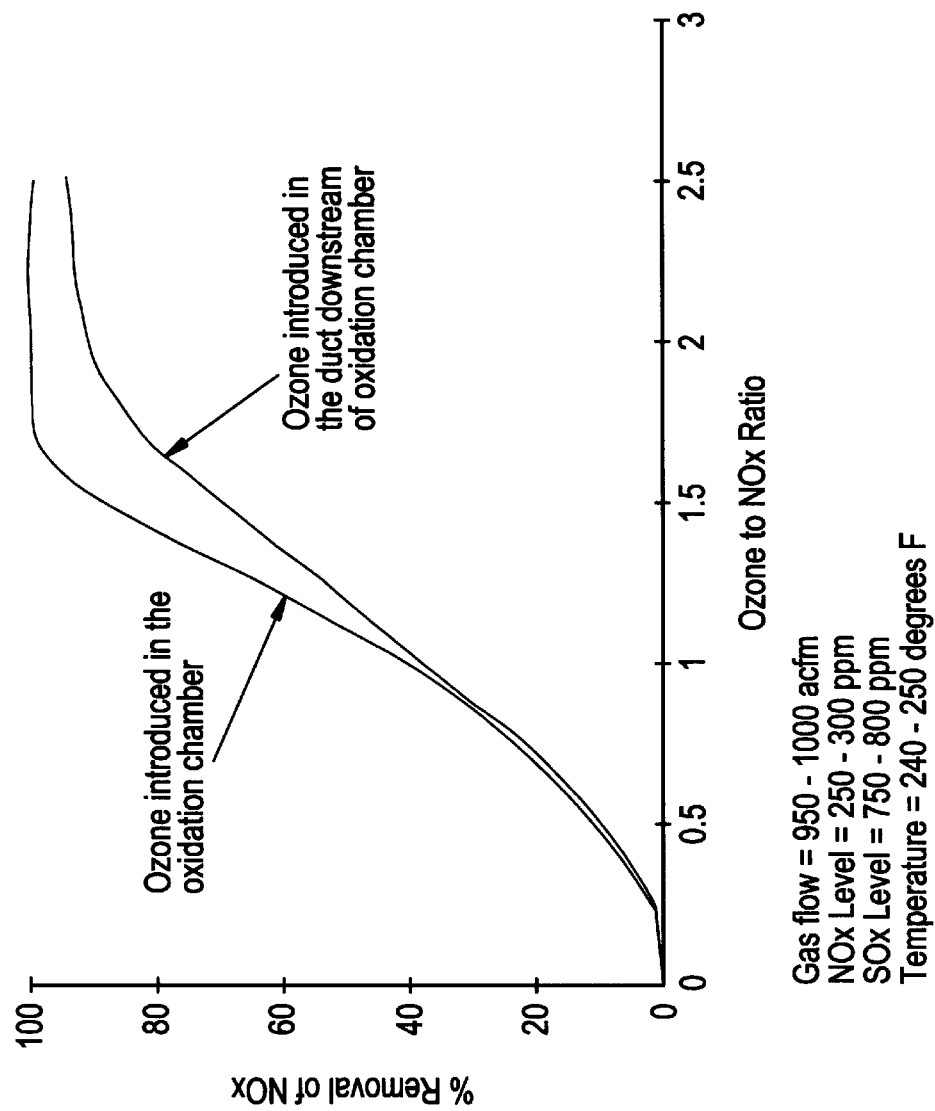

PROCESS FOR REMOVING $NO_x$ AND $SO_x$ FROM EXHAUST GAS

BACKGROUND OF THE INVENTION

1. Field of the Invention

This invention relates to a process for separating contaminants from the exhaust gases generated from combustion of fossil fuels, incineration, furnaces or gas streams of chemical processes, and more particularly, to the removal of nitrogen and sulfur oxides from an exhaust gas stream.

2. Description of the Prior Art

Nitrogen oxides ($NO_x$) and sulfur oxides ($SO_x$) are the main air pollutants found in the flue gases from combustion sources and chemical plants. The systems for removal of $SO_x$ gases by dry or wet scrubbing have reached an advanced stage of development. Other processes based on regenerative adsorbents are also available. Dry technologies are based on adsorption and wet technologies are based on absorption.

It is well known in the art to remove nitrogen oxides from flue gases by a number of dry and wet processes. Dry processes generally utilize catalytic decomposition or adsorption, while wet processes normally utilize absorption technology. A majority of the dry flue gas treatment (FGT) processes utilize catalytic decomposition or homogeneous decomposition at high temperatures. Dry flue gas treatment processes are normally carried out after the combustion process. Sometimes $CaO/CaCO_3$ is added in the fluidized bed during the combustion process. The major dry processes for $NO_x$ removal are: selective catalytic reduction (SCR) with $NH_3$, selective (non-catalytic) reduction with $NH_3$, non-selective catalytic reduction, and adsorption.

Wet processes are usually added downstream of all equipment prior to entering the stack. The major wet: processes for $NO_x$ removal are: absorption with liquid phase oxidation, absorption with liquid phase reduction, and gas phase oxidation followed by absorption.

U.S. Pat. Nos. 3,473,298; 4,681,744; and 4,799,941 disclose processes and devices where exhaust gases are first chilled with direct sprays and thereafter solid contaminants and water soluble substances are removed from the gases by contacting with the water sprays in a spray chamber. The water combines with water soluble gases, such as $SO_x$, contained in the gases to form sulfurous and sulfuric acids, which are collected with the water spray in a chamber. U.S. Pat. No. 3,881,004 discloses recovery of nitric acid by scrubbing a tail gas with an acid or an alkaline solution which minimizes the discharge of nitrogen oxides to the atmosphere. The publication entitled "Selection of Reactive Solvent for Pollution Abatement of $NO_x$" by K. R. Jethani et al., *Gas Separation & Purification*, vol. 4, March 1990, systematically reviews ten chemical reactive systems for removal of $NO_x$.

A number of U.S. patents disclose $NO_x$ either oxidized or reduced, preceding or following absorption in a liquid solution along with $SO_x$. Representative U.S. patents disclosing the state of the art include the following. U.S. Pat. No. 4,011,298 discloses removal of $NO_x$ by first oxidizing with ozone and absorbing in acidic solution containing iron compound. U.S. Pat. Nos. 4,541,999 and 4,564,510 disclose oxidation of $NO_x$ to $NO_2$ by addition of ozone followed by reaction with ammonia forming nitrite and nitrate on absorption and oxidation with air to form nitrate during desulfurization process. U.S. Pat. No. 4,247,321 discloses oxidation of $NO_x$ with ozone and absorbing in lime or limestone or calcium phosphate solution. U.S. Pat. No. 4,107,271 discloses use of iodide solution and ozone. U.S. Pat. No. 3,957,949 discloses use of ozone to convert $NO_x$ to $NO_2$ and absorbing in reactive medium like sodium chlorite. U.S. Pat. No. 3,997,415 discloses reduction of $NO_x$ and $SO_x$ by irradiation of gas stream. U.S. Pat. No. 4,971,777 discloses oxidation of $NO_x$ containing gas stream with help of organic compounds in the temperature range 300–900° C. then absorbing with ammonia. U.S. Pat. No. 4,119,702 discloses oxidation of NO with ozone, $H_2O_2$, chlorine dioxide and nitrogen dioxide followed by reduction with urea. U.S. Pat. No. 4,035,470 discloses a process wherein $NO_x$ containing gases are first oxidized with ozone and chlorine dioxide and then absorbed by sulfite, sulfide, polysulfide or thiosulfate of alkali or alkaline earth metals. U.S. Pat. Nos. 4,999,167; 5,206,002 and 5,316,737 disclose lowering the flue gas temperature near ambient temperature range, i.e 125° F., before mixing with ozone for $NO_x$ abatement. The oxidized contaminants are absorbed in water, or alkaline medium for removal of $NO_x$.

It is well known that NO is relatively inactive, and at low concentrations, its removal from gas steam is difficult and inefficient. It is also known that NO can be oxidized with many different chemical oxidants to form $NO_2$. With an oxidant, such as ozone, $NO_2$ is further oxidized to $N_2O_5$, which not only enhances reactivity but also solubility several fold resulting in ease in removal by absorption or adsorption with or without chemical reaction.

A disadvantage experienced with the prior art processes, as disclosed above, is either incomplete oxidation or mixing excessive oxidant in an absorption medium where ozone is wastefully consumed. As disclosed in U.S. Pat. No. 5,206,002, the temperature of flue gas is reduced to near ambient 125° F. before mixing ozone and the required residence time is provided to convert $NO_x$ to $N_2O_5$ with stoichiometric quantities of ozone. It is also well known that lowering temperature reduces the rate of oxidation of NO. Further, when ozone and $NO_x$ are both depleted to extinction in the oxidation chamber, the rate of oxidation decreases significantly. In addition, lowering temperature by recovering heat may not be an option when low temperature heat has no gainful use.

Thus, there is need for further improvements in the known oxidative processes to make them commercially viable processes. While oxidation of $NO_x$ to $NO_2$ is known to improve solubility and reactivity, it is not adequate to remove $NO_2$ in a cost effective manner. Therefore, there is need for an $NO_x$ removal process by which $NO_2$ can be further oxidized to a higher state, preferably to $NO_3$ of at least half of the quantity of $NO_x$.

Further, there is need to provide a process and an apparatus for removing contaminants, specifically $NO_x$ and $SO_x$ emissions, from exhaust gas that can be applied to any combustion (low or high sulfur coal fired, gas fired or oil fired, incineration, furnaces) or flue gas from chemical process system. $NO_x$ and $SO_x$ must be removed simultaneously but independently of one another. The process must not be dependent upon capital intensive equipment. The process must not cause scaling or lose performance with time. The abatement process must not produce secondary emissions or hazardous products and must be operable in a wide temperature range. The process must also be applicable for varying compositions of $NO_x$ while at the same time reduce the content of the contaminants in the exhaust gases to the required levels as prescribed by air quality regulations. An improved emission system is therefore required that not only brings the content of the contaminants in the exhaust gases into compliance with regulated air quality standards, but also has the capability to meet future standards.

SUMMARY OF THE INVENTION

In accordance with the present invention there is provided a process for removing nitrogen oxides and sulfur oxides from an exhaust gas stream that includes the steps of directing an exhaust gas stream containing contaminants including nitrogen oxides and sulfur oxides at an elevated temperature from a process system to an exhaust duct. The exhaust gas stream is conveyed through the exhaust duct. The exhaust gas is mixed with ozone in stoichiometric excess in a molar ratio in the range between about 0.2 to 2.8 moles of ozone to each mole of nitrogen oxide. The exhaust gas is maintained in contact with the ozone for a preselected period of time to convert the nitrogen oxides to equimolar amounts of $NO_2$ and $NO_3$ to form $N_2O_5$. A reagent liquid is introduced into the exhaust gas stream to transform $N_2O_5$ and $SO_2$ therein to dilute acids of $HNO_3$, $H_2SO_3$, and $H_2SO_4$. The dilute acids of $HNO_3$, $H_2SO_3$, and $H_2SO_4$ are absorbed into liquid water. The dilute acids are converted to salts, including nitrates, sulfites and sulfates for removal from the exhaust gas stream. Thereafter, the exhaust gas stream is discharged substantially free of nitrogen oxides and sulfur oxides from the exhaust duct.

Further the present invention is directed to a process for removing nitrogen oxides from an exhaust gas stream that includes the steps of directing an exhaust gas stream containing nitrogen oxide contaminants at an elevated temperature from a process system to an exhaust duct. The exhaust gas stream is conveyed through the exhaust duct. Ozone in stoichiometric excess is mixed with the exhaust gas to oxidize the nitrogen oxide contaminants to convert nitrogen oxides in the exhaust gas stream to equimolar ratios of $NO_2$ and $NO_3$. $NO_2$ and $NO_3$ are transformed in the presence of ozone to $N_2O_5$. A reagent liquid is mixed with the exhaust gas stream to convert $N_2O_5$, to dilute acids of nitrogen and to neutralize the acids to nitrogen salts. Thereafter, the exhaust gas stream is discharged substantially free of nitrogen oxide contaminants from the exhaust duct.

Additionally the present invention is directed to a process for removing contaminants from an exhaust gas stream that includes the steps of directing an exhaust gas stream containing contaminants at an elevated temperature to an exhaust duct. The exhaust gas stream is conveyed through the exhaust duct. The contaminants are mixed with an oxidant in stoichiometric excess to oxidize the contaminants in the exhaust gas. The oxidized contaminants and unreacted oxidant in the exhaust gas are mixed with a liquid reagent. The oxidized contaminants and unreacted oxidant are absorbed into the liquid reagent for removal from the exhaust gas. The exhaust gas is discharged substantially free of the contaminants and oxidant from the exhaust duct.

Additionally the present invention is directed to a process for removing nitrogen and sulfur oxides from an exhaust stream that includes the steps of directing an exhaust gas stream containing contaminants, including nitrogen oxides and sulfur oxides at an elevated temperature from a process stream to an exhaust duct. The exhaust gas stream is conveyed through the exhaust duct. Ozone in stoichiometric excess is mixed with the exhaust gas in a molar ratio in the range between about 0.2 to 2.8 moles of ozone to each mole of nitrogen oxides to convert the nitrogen oxides to eqimolar amounts of $NO_2$ and $NO_3$. The contaminants in the exhaust gas stream are oxidized to increase the absorbability of the nitrogen oxides and sulfur oxides in water. The exhaust gas is maintained in contact with an excess amount of ozone for a preselected period of time. The residence time of the exhaust gas in contact with ozone is monitored to ensure substantially complete conversion of the nitrogen oxides in the exhaust gas to either $N_2O_5$ or eqimolar proportions of $NO_2$ and $NO_3$ with a marginal amount of unreacted ozone remaining in contact with the exhaust gas. The sulfur oxides, excess ozone, oxidized contaminants containing $N_2O_5$ and eqimolar quantities of $NO_2$ and $NO_3$ are admixed with a reagent spray to convert $N_2O_5$, $NO_2$ and $NO_3$ and sulfur oxides to dilute acids including $HNO_3$, $H_2SO_3$ and $H_2SO_4$. The admixture of the reagent spray containing the dilute acids, including $HNO_3$, $H_2SO_3$, and $H_2SO_4$ and excess ozone are absorbed into liquid water. The dilute acids are converted to salts including nitrates, sulfites, and sulfates for removal from the exhaust gas stream. The ozone dissolved in the reagent is converted into oxygen with sulfite. Thereafter, the exhaust gas stream is discharged at about ambient temperature substantially free of the contaminants from the exhaust duct.

Accordingly, a principal object of the present invention is to provide a process for reducing the content of contaminants, such as $NO_x$ and $SO_x$, from exhaust gases to a level required by air quality standards while at the same time providing the capability of removing substantially all of the contaminants from the gases emitted from a combustion exhaust stream, chemical process, or process stream of manufacturing chemicals in the temperature range of 40 to 325° F. without causing any secondary emissions of oxidant.

Another object of the present invention is to provide a process for treating emissions from a combustion or chemical process that increases the absorption of contaminants, such as $NO_x$ and $SO_x$ emissions, into a solution to remove the contaminants from the exhaust gas or process gas.

A further object of the present invention is to provide a process for converting dilute nitrogen and sulfur acids to selected nitrates, sulfites and sulfates in solution and treating them, if necessary, prior to disposal of the solution.

An additional object of the present invention is to provide an improved process for economically removing nitrogen and sulfur oxides from streams of gaseous combustion products or other gaseous process streams so that the content of the nitrogen and sulfur oxides is reduced to a level acceptable within air and water quality control standards.

These and other objects of the present invention will be more completely disclosed and described in the following specification, accompanying drawings, and appended claims.

BRIEF DESCRIPTION OF THE DRAWINGS

FIG. 1 is a system flow diagram of a process for removing contaminants from the exhaust gases of chemical processes, fired heaters or fossil fired boilers, furnaces, and the like.

FIG. 2 is a graph quantitatively illustrating $NO_x$ removal from exhaust gas emitted from a gas fired boiler in accordance with the present invention.

FIG. 3 is a graph quantitatively illustrating $NO_x$ removal from exhaust gas emitted from a coal fired utility boiler of a power plant in accordance with the present invention.

DESCRIPTION OF THE PREFERRED EMBODIMENTS

Figure 1:
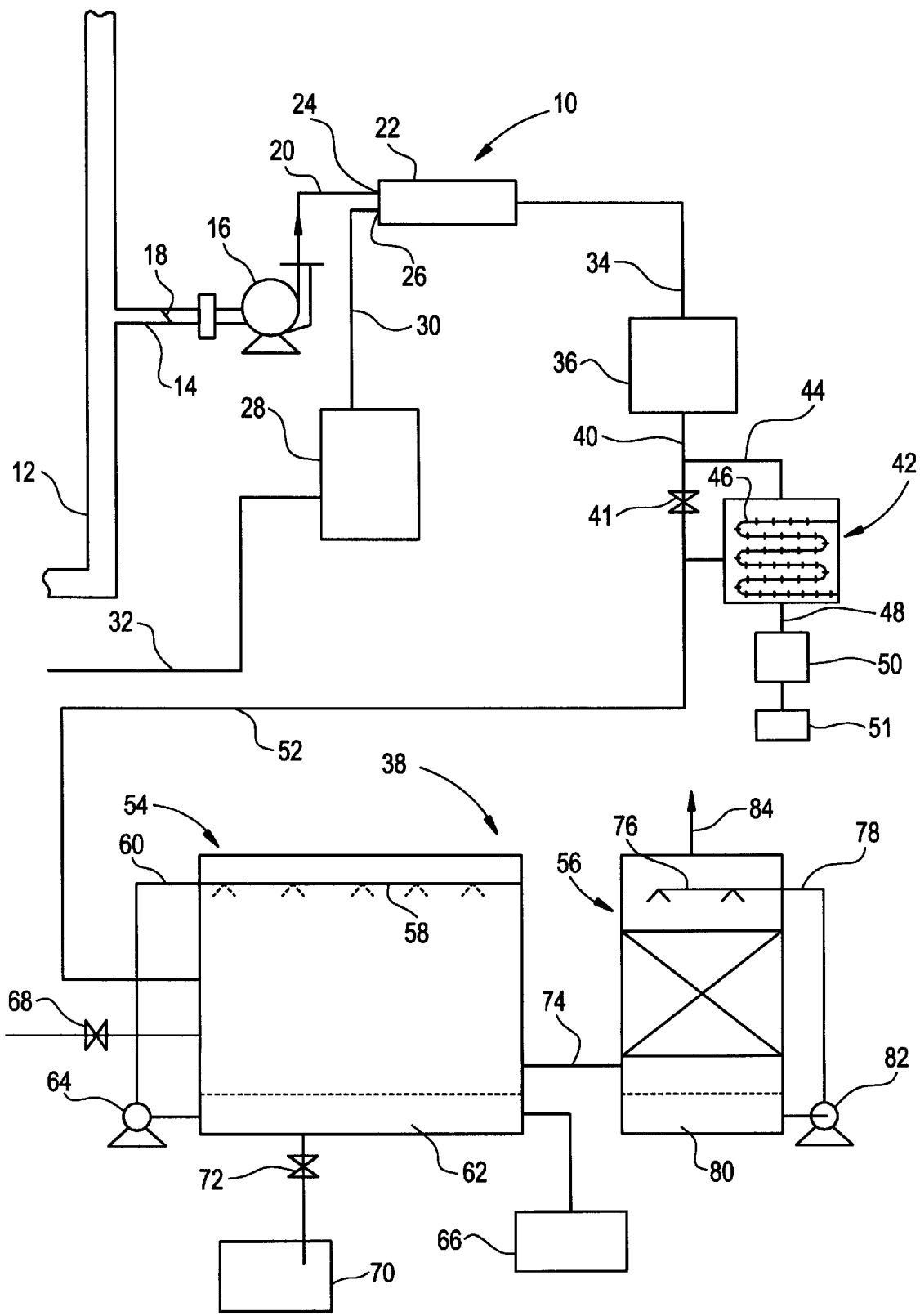

Referring to FIG. 1, there is illustrated $NO_x$ and $SO_x$ removal apparatus generally designated by the numeral 10 that is utilized with fired process heaters or fossil fueled boilers, such as a packaged firetube or water-tube boiler. The boiler may be of the type associated with utility power plants or those designed to generate as little as 2 million BTU/hr. fuel input energy to the boiler.

In one embodiment, the apparatus 10 is used as a polishing system to remove $NO_x$ and $SO_x$ contaminants from exhaust streams treated by other methods which are unable to achieve removal levels that are attainable by the present invention. Overall, $NO_x$ and $SO_x$ removal costs are optimized by incorporating the apparatus 10 downstream of a selected pollution abatement process.

The present invention can be combined with conventional dry and wet abatement processes. Example dry flue gas treatment processes adaptable for use with the present invention include selective catalytic reduction (SCR) and selective non-catalytic reduction (SNCR). Example wet processes include absorption with liquid phase oxidation, absorption with liquid phase reduction, and gas phase oxidation followed by absorption. With both wet and dry processes, the apparatus 10 is added downstream of all equipment prior to entering the stack. In this manner, the present invention is used to supplement conventional abatement equipment to achieve lower ppm levels of $NO_x$ and $NO_x$ in exhaust gas emissions not otherwise attainable by conventional equipment.

As shown in FIG. 1, a flue gas stream from multiple utility boilers is directed at a flow rate of 6.2 million lbs/hr through a stack or exhaust duct 12. The duct 12 is connected to a supply duct 14 which includes a fan 16 that diverts the combustion exhaust gases from the stack 12 into the supply duct 14. The supply duct 14 is provided with a damper 18 positioned upstream of the fan 16 to seal off the duct 14 and permit the exhaust gases to be emitted from the duct 12, if desired. The fan 16 diverts the exhaust gases from the duct 14 at an elevated temperature through a duct system 20 to a static mixer 22.

It should be understood that the present invention is adaptable for use with a wide variety of boilers or chemical processes including gas fired boilers, major process boilers, liquor recovery boilers, as well as smaller fired process heaters, process steam boilers, furnaces, gaseous process streams and nitric acid plants. In the case of coal fired utility boilers or gas fired boilers, the temperature of the boiler exhaust gases flowing through the exhaust duct 12 is in the range between about 220° F. to 325° F.

The fan 16 conveys the exhaust gas stream from the exhaust duct 12 and supply duct 14 through duct system 20 to static mixer 22 at a temperature range of approximately 40° F. to 325° F. The static mixer 22 has flue gas inlets 24 and 26. The inlet 24 is connected to duct system 20, and inlet 26 is connected to an ozone generator 28 via duct 30. The fan 16 is also operable to effect mixing of ozone. Ozone generator 28 receives through conduit 32 a gas feed stream which can be dried air, oxygen or mixture of air and oxygen. The fluid stream supplied by the generator 28 to the static mixer 22 is 1% to 20% by weight ozone.

In the static mixer 22, the flue gas is mixed with ozone ($O_3$) and conveyed through conduit 34 to a reaction chamber 36 where the exhaust gas contaminants are oxidized. In the reaction chamber 36, $NO_x$, $SO_x$, CO and other contaminants are oxidized by the presence of ozone. The exhaust gas conveyed to chamber 36 comprises approximately 95% NO and 5% $NO_2$. The reactions that take place in chamber 36 to transform NO to $NO_2$, $NO_3$ and $N_2O_5$ include the following:

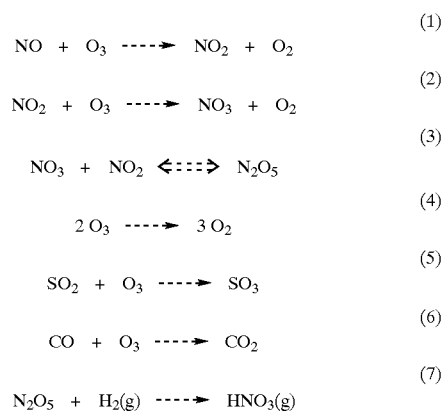

Reaction (1) involving oxidation of NO to $NO_2$ is almost instantaneous. Between reactions (2) and (3), reaction (2) is slower than reaction (3). The rate of oxidation of $NO_2$ to $NO_3$ increases with increase in the temperature.

As disclosed, in CRC handbook (1980–81) $N_2O_5$ decomposes at a temperature over 120° F. In one approach to this condition, U.S. Pat. No. 5,206,002, discloses lowering the temperature to 125° F., prior to admixing the ozone and converting $NO_x$ to $N_2O_5$. U.S. Pat. Nos. 4,247,321; 4,541,999 and 4,564,510 provide for mixing ozone at higher temperatures but without providing enough residence time for oxidation of $NO_x$ in the gas phase. Also, ozone is directly introduced into the scrubber, which leads to formation of nitrite in the scrubber. In contrast, $N_2O_5$ absorption results in selective formation of nitrate. Presence of nitrite in nitrate is undesirable for use in fertilizer.

In accordance with the present invention ozone is mixed at temperatures between about 40° F. to 325° F. for a preselected residence time in the reaction chamber 36 to convert the nitrogen oxides in the exhaust gas stream to equimolar amounts of $NO_2$ and $NO_3$ to form $N_2O_5$ in the reaction chamber 36. In the reaction chamber 36 ozone is mixed in stoichiometric excess with the exhaust gas in a molar ratio in the range between about 0.2 to 2.8 moles of ozone to each mole of nitrogen oxide.

In the reaction (4) above, ozone decomposes at a temperature in the range between about 220° F. to 325° F. Therefore, the dimensions of the reaction chamber 36 are selected to allow the $NO_x$ in the gaseous exhaust stream to occupy a preselected residence time which is sufficiently long to oxidize $NO_x$ to higher order oxides and to consume substantially all of the ozone with minimum decomposition.

It is conventional practice in design of a chemical system to add one chemical in stoichiometric excess over the other (limiting reactant) to deplete the concentration of the limiting reactant to extinction at a reasonably fast rate. However, this leads to an unreacted amount of the excess reactant at the exit of the system. In the present invention, operation of the reaction chamber 36 at temperatures in excess of 125° F. with a marginal increase of ozone requirements significantly reduces the size required for the oxidation chamber 36 in order to attain the desired levels of $NO_x$ reduction.

In one example referring to FIG. 2, there is graphically illustrated data representing the quantity of $NO_x$ removed from the exhaust gas emitted from a gas fired boiler. Flue gas at a temperature in the range of 125° F. to 130° F. required approximately 20 seconds after mixing with ozone to reduce $NO_x$ levels to 2 ppm in the treated exhaust gas stream. The second set of data points on the graph illustrates $NO_x$ removal at approximately 245° F. with an increase in ozone feed by 7 percent to achieve the preferred level of oxidation within 3 to 4 seconds of residence time in the reaction chamber 36.

Further in accordance with the present invention, in addition to $NO_x$, carbon monoxide and $SO_2$ are partially oxidized to carbon dioxide and sulfur trioxide reaction in the chamber 36, a small quantity of ozone also decomposes forming oxygen at the temperature range between about 220° F. to 325° F. However, in most cases, the required molar ratio mainly depends on the ratio of NO to $NO_2$, concentration of $NO_x$, and the extent of $NO_x$ removal. With the present invention, the ozone to $NO_x$ molar ratio is preferably in the range between about 0.2 to 2.8.

From the reaction chamber 36, the treated contaminants are introduced into a combination spray/absorption chamber generally designated by the numeral 38. However in one embodiment of the present invention before the oxidized exhaust gas contaminants are introduced into the absorption chamber 38, the temperature of the treated gas stream is lowered. This is accomplished as illustrated in FIG. 1 by diverting the treated exhaust gas from duct 40 to conduit 44 by closing valve 41 in duct 40 for flow to a heat exchanger or economizer 42. The treated exhaust gas enters the economizer 42 at a temperature of up to about 325° F. The economizer 42 includes a cooling tube 46 that extends in a serpentine path within the economizer. The tube 46 is equipped with cooling fins, as well known in the art.

Heat is transferred in the economizer 42 to water in the tube 46. The water is heated in the tube and is conveyed from the economizer 42 to a tank (not shown). As a result, both latent and sensible heat is recovered from the exhaust gas passing through the economizer 42.

The economizer 42 also serves to partially scrub or absorb contaminants contained in the treated exhaust gas. This is accomplished by moisture in the exhaust gas condensing on the surface of the tube 46 and also on the fins mounted on the tube 46. Condensation of moisture on the tube 46 and the tube fins progressively lowers the temperature of the exhaust gas below the dew point of the exhaust gas. The condensate passes from the economizer 42 through an outlet 48 to a condensate collector 50 for subsequent holding and treatment in tank 51.

It should be understood that the provision of the economizer 42 to lower the temperature of the treated exhaust gases and to partially scrub and aid in the absorption of contaminants remaining in the treated exhaust gases is selective. In this respect, the economizer 42 in another embodiment is bypassed by opening valve 41 so that the treated exhaust gas from the reaction chamber 36 is fed directly to the absorption chamber 38.

One advantage in utilizing the economizer 42 to lower the exhaust gas temperature and condense the water vapor in the exhaust gas is to achieve maximum efficiency in the separation of the contaminants from the exhaust gas stream in the absorption chamber. By reducing the temperature of the treated exhaust gas to about ambient temperature, the absorbability of the contaminants in the exhaust gas with a reagent solution is greatly enhanced, particularly in the absorption of nitrogen, sulfur and carbon dioxides. The treated exhaust gas, which may be cooled to about ambient temperature as above described, is conveyed through a duct system 52 to the absorption chamber 38. Preferably, the chamber 38 includes two sections or subchambers. In a first chamber generally designated by the numeral 54 the exhaust gas stream is treated with a reagent liquid, preferably by spray. In a second chamber generally designated by the numeral 56 the exhaust gas stream is scrubbed.

Chamber 54 includes an array of spray nozzles 58 connected to a spray header 60. Spray header 60 receives a reagent solution, such as water, from a tank 62 through a pump 64. The exhaust gas stream is quenched and cooled by the reagent or water sprays. The $NO_x$ and $SO_x$ are absorbed into the sprayed liquid to form nitrogen and sulfur oxy acids. The dilute acids in situ are converted into nitrates, sulfites and sulfates in presence of caustic soda in accordance with the following reactions. In one embodiment lime or lime stone slurry is used, and calcium salts are formed.

(8)

(9)

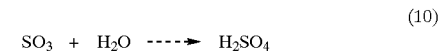
(10)

(11)

(12)

(13)

Concentrated reagents are supplied from a chemical metering and storage tank 66 into recirculation tank 62. Make-up water through valve 68 maintains a constant resettable level of solution in tank 62. Suitable reagents, in liquid and spray form, for use with the present invention include water, an aqueous solution of alkali or alkaline earth metal hydroxides and carbonates, an aqueous solution of alkali or alkaline earth metal sulfites, and aqueous ozone scavenger. These reagents may be used individually or in selected combination and an excess of solution is diverted to the holding and treatment tank 70 through valve 72. The reagent solution is maintained at a suitable concentration by controlling the rate of spent solution diverted to the holding and treatment tank 70.

In an alternative embodiment of the present invention, instead of using spray chamber 54 for removal of $NO_x$, a packed scrubber, or a venturi scrubber, or a plate column with or without ultra sonics, or lime injected dry scrubber is used as an absorption chamber. In operations that require that the exhaust gas be substantially reduced in temperature, a heat exchanger is incorporated in the absorption chamber 54 to bring down the temperature of the gas and used as an absorption chamber. Provisions are also made to recover heat from the chamber 54 when operated with a heat exchanger.

The exhaust gas stream entering the absorption chamber 54, also contains unreacted ozone. In the absorption chamber 54, ozone is absorbed in circulating liquid. Solubility of ozone in water is very low limiting removal by absorption. However, when $SO_2$ is present in the gas phase, sulfite is formed in situ in the circulating liquid. The sulfite readily reacts with ozone forming sulfate as indicated by reaction (14) below, enhancing the absorption of ozone several fold. Accordingly, the present invention advantageously incorporates the phenomena in depleting unreacted ozone from the exhaust gas stream and the use of scrubbing chamber 56.

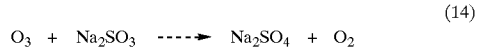

$$O_3 + Na_2SO_3 \dashrightarrow Na_2SO_4 + O_2 \qquad (14)$$

When the exhaust gas stream emitted from the boiler in the exhaust duct 12 does not contain $SO_2$, the treated contaminants from the chamber 58, are introduced through connecting duct 74 into a second or spray/absorption chamber 56 having spray nozzles or a liquid distributor system 76 connected to a spray header 78. Spray header 78 receives a reagent solution, (ozone scavenger), such as aqueous sodium sulfite solution, from a tank 80 through a pump 82. The gas phase of the exhaust gas stream in chamber 56 is brought in intimate contact with the liquid phase generated by the distributor system 76 until almost all of the oxidant is absorbed by the reagent solution.

Treated gas free from contaminants and oxidant is exhausted from the chamber 56 through stack 84. The reagent solution is replenished periodically or continuously with fresh charge of ozone scavenger. In another embodiment of the present invention, the absorption chamber 56 for destroying ozone is replaced with a catalyst chamber (not shown) that uses a catalyst such as $MnO_2$. Further ozone slip is eliminated by extracting from the ducts before mixing with ozone a small amount of untreated exhaust gas containing $NO_x$ and introducing it into the scrubber chamber 56. The $NO_x$ in the untreated gas promptly reduces any ozone present in the treated gas.

Referring to FIG. 3, there is graphically illustrated data from a slip stream test conducted on an exhaust gas stream emitted from a coal fired boiler of a power plant. The temperature of the gas stream was in the range between about 240–250° F. The level of $NO_x$ was in the range between about 250–300 ppm. One set of data points represents the condition where the ozone is introduced in the oxidation or reaction chamber 36. A second set of data points represents the condition where ozone is introduced in the duct system 52 downstream of the oxidation or reaction chamber 36 before the exhaust gas stream enters the absorption chamber 38. In the case when oxidation time was inadequate, less $NO_x$ removal was observed for identical amounts of ozone added.

The optimum residence time of the exhaust gas in the reaction chamber 36 is dependent upon the initial concentration of contaminants, the temperature, and the molar ratios of $O_3/NO_x$. When the level of $NO_x$ in the treated gas is desired to be less than 10 ppm, ozone is required in excess of the stoichiometric amount required to oxidize the NO and $NO_2$. The presence of excess ozone in the exhaust gas stream may result in some unreacted ozone entering the absorption chamber. Ozone solubility in an aqueous medium is limited. When $SO_2$ is present in the gas phase, sulfite or sulfurous acid formed in the absorption chamber 54 may aid in destroying ozone. The provision of the scrubber chamber 56 serves to prevent emission of ozone to the atmosphere.

In one example of the present invention, an exhaust gas flow with 300 ppm by volume of $NO_x$ at 245° F. requires up to 2 to 3 seconds residence time in the reaction chamber 36 at an $O_3/NO_x$ ratio of 1.68 in presence of 600–700 ppm of $SO_2$ and 100–200 ppm of CO.

One of the advantages of optimized residence time in reaction chamber 36 is that only a marginal excess amount of ozone enters scrubbing section 56. Wet ozone is very corrosive. Ozone in the scrubber converts sulfite to sulfate. Thus introduction of excessive amount of ozone in an aqueous media to convert sulfite to sulfate is wasteful.

Ozone also undergoes decomposition in an aqueous medium when pH is alkaline. Furthermore, when lime or lime stone slurry is used, $SO_2$ absorption results in formation of calcium sulfite. Ozone further converts to calcium sulfate. Calcium sulfate is relatively more difficult to handle in wet scrubbing as it forms abrasive scales.

The removal of $SO_x$ is highly dependent upon the pH of the reagent. The pH of the reagent has very little effect on $NO_x$ removal. With the present invention, $SO_x$ removal is decreased with lowering the reagent pH below 8.5 while $NO_x$ removal is not affected for a reagent pH in the range of 3–12. In some cases at higher pH, along with high $SO_x$ removal, $CO_2$ is also absorbed in alkali or alkaline earth metal solutions forming precipitates of carbonate and other co-salts. Also use of reagent for $CO_2$ removal is wasteful and undesired. These precipitates have tendency to form scales. $NO_x$ removal in accordance with the present invention when conducted at a pH below 7 resulted in the descaling of the scrubbing chamber 56.

With the above described arrangement the exhaust gas is emitted from the stack 84 into the atmosphere at a ppm level that meets the air quality standards established by such public agencies as the E.P.A. or California's South Coast Air Quality Management District. For example, with the present invention the emissions from the stack 84 contain less than 2 ppm of $NO_x$ contaminants. The exhaust gas is emitted at a relatively low temperature due to the wet scrubbing.

As an additional example, the present invention removes nitrogen oxides from a steel strip pickling line using nitric acid as the pickling agent. The $NO/NO_2$ mixture to be removed consists of 3 moles of $NO_2$ to every mole of NO with the exhaust gas stream maintained at 180° F. The $NO_x$ is converted to equimolar amounts of $NO_2$ and $NO_3$. With a molar ratio of 0.75 to 1 of ozone to $NO_x$, 95% of the $NO_x$ is removed from the exhaust gas stream exiting the scrubbing chamber from the stack 84.

According to the provisions of the patent statutes, we have explained the principle, preferred construction, and mode of operation of our invention and have illustrated and described what we now consider to represent its best embodiments. However, it should be understood that within the scope of the appended claims the invention may be practiced otherwise than as specifically illustrated and described.

We claim:

1. A process for removing nitrogen oxides and sulfur oxides from an exhaust gas stream comprising the steps of, directing an exhaust gas stream containing contaminants including nitrogen oxides and sulfur oxides at an elevated temperature from a process system to an exhaust duct, conveying the exhaust gas stream through the exhaust duct, mixing ozone in stoichiometric excess with the exhaust gas in a molar ratio in the range between about 0.2 to 2.8 moles of ozone to each mole of nitrogen oxide, maintaining the exhaust gas in contact with the ozone for a preselected period of time to convert the nitrogen oxides to equimolar amounts of $NO_2$ and $NO_3$ to form $N_2O_5$, introducing a reagent liquid into the exhaust gas stream to transform $N_2O_5$ and $SO_2$ therein to dilute acids of $HNO_3$, $H_2SO_3$ and $H_2SO_4$, absorbing the dilute acids of $HNO_3$, $H_2SO_3$, and $H_2SO_4$ into liquid water, converting the dilute acids to salts including nitrates, sulfites, and sulfates for removal from the exhaust gas stream, and thereafter discharging the exhaust gas stream substantially free of nitrogen oxides and sulfur oxides from the exhaust duct.

2. A process as set forth in claim 1 which includes, conveying the exhaust gas stream at a temperature in a range between about 40° to 325° F. for mixture with ozone, and mixing ozone in stoichiometric excess with the exhaust gas in a static mixer.

3. A process as set forth in claim 1 which includes, feeding the mixture of ozone and exhaust gas to a reaction chamber for oxidation of $NO_x$ and $SO_x$ contaminants in the exhaust gas to form $N_2O_5$.

4. A process as set forth in claim 1 which includes, lowering the temperature of the oxidized contaminants prior to mixture with the reagent liquid to partially scrub the contaminants from the exhaust gas and recover heat therefrom.

5. A process as set forth in claim 1 which includes, after mixing the ozone with the exhaust gas, lowering the temperature of the ozone and exhaust gas mixture to about ambient temperature, condensing moisture in the exhaust gas as the temperature thereof is lowered to form a condensate, removing contaminants from the exhaust gas by absorbing the contaminants in the condensate, and collecting the exhaust gas contaminants absorbed in the condensate.

6. A process as set forth in claim 1 which includes, after mixing ozone with the exhaust gas, absorbing $N_2O_5$ and $SO_2$ in a liquid alkaline scrubber to form nitrogen and sulfur oxy acids.

7. A process as set forth in claim 1 which includes, introducing caustic soda as the reagent liquid into the exhaust gas stream.

8. A process as set forth in claim 1 which includes, converting the dilute acids in the presence of lime to calcium salts.

9. A process as set forth in claim 1 which includes, depleting unreacted ozone from the exhaust gas stream by reacting sulfite formed from $SO_2$ in the exhaust gas with ozone to form sulfate.

10. A process as set forth in claim 1 which includes, conveying the exhaust gas stream containing oxidized contaminants to a two part absorption chamber, passing the exhaust gas through El first aqueous alkaline scrubber to form the dilute acids, and conveying the exhaust gas from the first aqueous alkaline scrubber to a second aqueous alkaline scrubber for further removal of contaminants and excess ozone remaining in the exhaust gas by absorption in an alkaline solution.

11. A process as set forth in claim 10 which includes, introducing untreated exhaust gas containing $NO_x$ into the second aqueous alkaline scrubber for reduction of excess ozone remaining in the exhaust gas to prevent ozone from being emitted with the exhaust gas from the second scrubber to the atmosphere.

12. A process as set forth in claim 1 which includes, mixing the exhaust gas stream in a scrubber chamber with the reagent liquid having a pH below 7 to descale precipitates formed on interior walls of the scrubber chamber.

13. A process for removing nitrogen oxides from an exhaust gas stream comprising the steps of, directing an exhaust gas stream containing nitrogen oxide contaminants at an elevated temperature from a process system to an exhaust duct, conveying the exhaust gas stream throuch the exhaust duct, mixing ozone in stoichiometric excess with the exhaust gas to oxidize the nitrogen oxide contaminants to convert nitrogen oxides in the exhaust gas stream to equimolar ratios of $NO_2$ and $NO_3$, transforming $NO_2$ and $NO_3$ in the presence of ozone to $N_2O_5$, mixing a reagent liquid with the exhaust gas stream to convert $N_2O_5$ to dilute acids of nitrogen and to neutralize the acids to nitrogen salts, and thereafter discharging the exhaust gas stream substantially free of nitrogen oxide contaminants from the exhaust duct.

14. A process as set forth in claim 13 which includes, feeding the mixture of ozone and exhaust gas to a reaction chamber, operating the reaction chamber at temperatures in excess of 125° F., and oxidizing the $NO_x$ contaminants in the reaction chamber for a period of time between about 3 to 20 seconds.

15. A process as set forth in claim 14 which includes, after oxidizing the $NO_x$ contaminants, lowering the temperature of the exhaust gas and scrubbing the contaminants in the exhaust gas, and collecting exhaust gas condensate.

16. A process as set forth in claim 13 which includes, reducing the temperature of the exhaust gas stream to about ambient temperature after oxidizing the nitrogen oxide contaminants to enhance the absorbability of the contaminants in the reagent liquid.

17. A process as set forth in claim 13 which includes, introducing the exhaust gas after oxidizing the contaminants into a scrubber containing an alkaline solution for absorbing $N_2O_5$ in the exhaust gas into the solution to form the dilute acids, and converting the dilute acids in the presence of caustic soda into nitrates.

18. A process as set forth in claim 17 which includes, removing excess ozone remaining in the exhaust gas in the scrubber by spraying the exhaust gas with an aqueous sodium sulfite solution to absorb the excess ozone in the solution.

19. A process as set forth in claim 17 which includes, removing excess ozone remaining in the exhaust gas in the scrubber by introducing untreated exhaust gas containing $NO_x$ into the scrubber to reduce the excess ozone and remove the ozone from the exhaust gas before emission to the atmosphere.

20. A process as set forth in claim 17 which includes, contacting the exhaust gas with the reagent liquid in a first scrubber followed by contacting the exhaust gas with an aqueous sodium sulfite solution in a second scrubber.

21. A process for removing nitrogen and sulfur oxides from an exhaust stream comprising the steps of, directing an exhaust gas stream containing contaminants including nitrogen oxides and sulfur oxides at an elevated temperature from a process system to an exhaust duct, conveying the exhaust gas stream through the exhaust duct, mixing ozone in stoichiometric excess with the exhaust gas in a molar ratio in the range between about 0.2 to 2.8 moles of ozone to each mole of nitrogen oxide to convert the nitrogen oxides to equimolar amounts of $NO_2$ and $NO_3$.

oxidizing the contaminants in the exhaust gas stream to increase the absorbability of the nitrogen oxides and sulfur oxides in water, maintaining the exhaust gas in contact with an excess amount of ozone for a preselected period of time, monitoring the residence time of the exhaust gas in contact with ozone to ensure substantially complete conversion of the nitrogen oxides in the exhaust gas to either $NO_5$ or equimolar proportions of $NO_2$ and $NO_3$ with a marginal amount of unreacted ozone remaining in contact with the exhaust gas, admixing the sulfur oxides, excess ozone, oxidized contaminants containing $N_2O_5$ and equimolar quantities of $NO_2$ and $NO_3$ with a reagent spray to convert $N_2O_5$, $NO_2$ and $NO_3$ and sulfur oxides to dilute acids including $HNO_3$, $H_2SO_3$ and $H_2SO_4$, absorbing the admixture of reagent spray containing the dilute acids including $HNO_3$, $H_2SO_3$, and $H_2SO_4$ and excess ozone into liquid water, converting the dilute acids to salts including nitrates, sulfites and sulfates for removal from the exhaust gas stream, converting ozone dissolved in the reagent into oxygen with sulfite, and thereafter discharging the exhaust gas stream at about ambient temperature substantially free of the contaminants from the exhaust duct.

22. A process as set forth in claim 21 which includes, lowering the temperature of the oxidized contaminants prior to admixing with the reagent spray to partially scrub the contaminants from the exhaust gas.

23. A process as set forth in claim 21 which includes, depleting excess ozone, remaining in the exhaust gas after converting the dilute acids to salts, by conveying the exhaust gas stream through a catalyst chamber containing $MNO_2$.

24. A process as set forth in claim 21 which includes, feeding the ozone and exhaust gas mixture to an economizer, and scrubbing the contaminants from the exhaust gas by collecting exhaust gas condensate formed in the economizer.

* * * * *